United States Patent
Hemmerlein et al.

(10) Patent No.: US 12,372,079 B2
(45) Date of Patent: Jul. 29, 2025

(54) FUEL PUMP

(71) Applicant: Cummins Inc., Columbus, IN (US)

(72) Inventors: Rodney J. Hemmerlein, Columbus, IN (US); Michael A. Lucas, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/334,698

(22) Filed: Jun. 14, 2023

(65) Prior Publication Data

US 2023/0323868 A1 Oct. 12, 2023

Related U.S. Application Data

(63) Continuation of application No. PCT/US2021/065659, filed on Dec. 30, 2021.

(60) Provisional application No. 63/132,721, filed on Dec. 31, 2020.

(51) Int. Cl.
*F04B 11/00* (2006.01)
*F16K 1/36* (2006.01)
*F16K 47/02* (2006.01)

(52) U.S. Cl.
CPC ............... *F04B 11/00* (2013.01); *F16K 1/36* (2013.01); *F16K 47/02* (2013.01)

(58) Field of Classification Search
CPC . F04B 11/00; F16K 1/36; F16K 47/02; F02M 2200/04; F02M 59/466; F02M 59/367
See application file for complete search history.

(56) References Cited

U.S. PATENT DOCUMENTS

| 4,163,634 | A | 8/1979 | Powers |
| RE34,591 | E * | 4/1994 | Yoshida ................ F02M 45/12 239/96 |
| 5,860,597 | A | 1/1999 | Tarr |
| 6,109,893 | A | 8/2000 | Gliniecki et al. |
| 6,874,751 | B2 * | 4/2005 | Ojima ................ F16K 31/0637 335/277 |
| 7,509,948 | B1 | 3/2009 | DePayva et al. |

(Continued)

OTHER PUBLICATIONS

International Search Report and Written Opinion for International patent application No. PCT/US2021/065659, filed Dec. 30, 2021, mailed Mar. 17, 2022, 10 pgs.

*Primary Examiner* — Patrick C Williams
(74) *Attorney, Agent, or Firm* — Taft, Stettinius & Hollister LLP

(57) ABSTRACT

A valve includes a valve body having a valve plunger barrel formed therein and configured to be mounted to a pump head of a fuel pump, a valve plunger arranged to perform reciprocal motion with respect to the valve plunger barrel, a drive assembly configured to cause the valve plunger to perform reciprocal motion, and a spacer configured to couple to the valve plunger to perform reciprocal motion together with the valve plunger and configured to interface with the pump head. The spacer has a spacer body with first and second opposing spacer surfaces and with a central aperture extending from the first to the second spacer surface and configured to receive the valve plunger therethrough. At least one of the first and second spacer surfaces includes one or more grooves recessed into the spacer body to reduce or inhibit cavitation of the interface of the spacer and pump head.

20 Claims, 9 Drawing Sheets

(56) References Cited

U.S. PATENT DOCUMENTS

| | | |
|---|---|---|
| 7,857,605 B2 | 12/2010 | Tian et al. |
| 8,436,704 B1 | 5/2013 | Venkataraghavan et al. |
| 2004/0021012 A1 | 2/2004 | Lewentz et al. |
| 2004/0228721 A1 | 11/2004 | Takagi et al. |
| 2006/0138374 A1* | 6/2006 | Lucas ................ F16K 31/0689 |
| | | 251/129.16 |
| 2009/0008883 A1 | 1/2009 | Nakayama et al. |

* cited by examiner

DETAIL A

FUEL PUMP

CROSS-REFERENCE TO RELATED APPLICATION

The present application is a continuation of International Patent App. No. PCT/US2021/065659 filed Dec. 30, 3021, which claims priority to U.S. Provisional Application No. 63/132,721 filed on Dec. 31, 2020, each of which is incorporated herein by reference in its entirety and for all purposes.

TECHNICAL FIELD

The present disclosure related generally to pumps, such as fuel pumps and, more particularly, to pumps with component design features configured for reduced cavitation wear.

BACKGROUND

Pumps may include a pumping plunger that is reciprocally driven within a pumping chamber to pressurize a fluid in the pumping chamber and to cause the fluid to exit the chamber through an outlet passage. Inlet valves may be used to control the flow of fluid from an inlet passage into the pumping chamber. Inlet valves of high pressure fuel pumps, for example, may include a valve plunger that reciprocally moves between a closed position, causing the inlet passage to be fluidly sealed with respect to the pumping chamber, and an open position, causing the inlet passage to be fluidly coupled to the pumping chamber. Inlet valves of these types may include solenoid-type actuators having stators and armatures for actuating the valve plunger. The armature may be coupled to the valve plunger. A biasing member such as a spring may bias the valve plunger to the open position at which the armature is spaced apart from the stator core by a gap. When the stator is energized by the application of electrical energy to coils around the stator core, it produces a magnetic flux field that causes the armature to be drawn toward the stator core against the bias force of the spring, thereby driving the valve plunger to the closed position. When the stator is de-energized, the spring drives the valve plunger back to the open position.

In high-pressure fuel pumps of these types, the chamber in which the armature moves may not be sealed from the source of fuel. For example, the armature chamber may be in fluid communication with the inlet passage, and fuel may flow into the gap between the armature and core. The armature and valve plunger are typically driven at high rates. To enhance the magnetic flux field coupling between the stator and armature and facilitate performance of the inlet valve, the armature and stator can be positioned in relatively close proximity to one another.

Inlet valves with these features may produce an operating characteristic sometimes known as cavitation. As the pumping plunger reciprocation rate increases, so too does the rate at which the inlet valve opens and closes. The armature and valve plunger therefore move between the open and closed positions at relatively high velocities. As the armature moves toward and away from the stator core, cyclic waves of high-pressure fuel and low-pressure fuel may be created around the armature (e.g., in the gap between the armature and core). The relatively low pressures produced during the low-pressure portions of the cycle may cause the vaporization of fuel. During the high-pressure portions of the cycle, any vaporized fuel may collapse or return to liquid form. Energy released during these fuel phase changes may cause wear on components such as the stator and/or armature.

There remains a continuing need for improved pumps, such as high-pressure fuel pumps. In particular, there is a need for improvements to mitigate cavitation or the wear that may be produced by such cavitation. Structures and methods that can efficiently provide enhancements of these types would be especially desirable.

SUMMARY

Disclosed examples include valves for pumps, such as inlet valves for high pressure fuel pumps, with structures to reduce or minimize cavitation and associated wear on the valve. A valve for a fuel pump can include a valve body, a plunger, a drive assembly, and a spacer. The valve body can have a plunger barrel formed therein and can be configured to form part of a pump head of the fuel pump. The plunger can be arranged to perform reciprocal motion with respect to the plunger barrel. The drive assembly can be configured to cause the plunger to perform reciprocal motion. The spacer can be configured to couple to the plunger so as to perform reciprocal motion together with the plunger and can be configured to interface with the valve body. The spacer can have a spacer body with a first face, a second face that is opposite the first face, and a central aperture that extends from the first face to the second face. The spacer can be configured to receive the plunger through the central aperture. At least one of the first face and the second face can include one or more grooves that are recessed into the spacer body so as to reduce or inhibit cavitation of the spacer where the pump head interfaces with the spacer.

In examples, the spacer body can be a closed ring shape such that the spacer surrounds a portion of plunger that is coupled to the spacer. The spacer can be coupled to the plunger so as to perform reciprocal motion together with the plunger and configured to interface with the valve body. The spacer can have a spacer body with a first face, a second face that is opposite the first face, and a central aperture that extends from the first face to the second face. The spacer can be configured to receive the plunger through the central aperture. At least one of the first face and the second face can include one or more grooves that are recessed into the spacer body so as to reduce or inhibit cavitation of the spacer where the pump head interfaces with the spacer.

A plunger assembly can include a plunger and a spacer. The plunger can be configured to perform, via a drive assembly, reciprocal motion within a valve body. The plunger can be coupled to a portion of the drive assembly. In examples, a first shoulder portion of the at least one shoulder portion can include at least one flattened portion extending in a direction along a central axis of the elongate plunger body so as to form a fluid flow passage between the plunger barrel, in which the plunger is arranged, and the at least one flattened portion. The fluid flow passage can be in fluid communication with a groove of the one or more grooves.

In examples, both the first and second faces can include the one or more grooves. In examples, the one or more grooves at both the first and second faces can include a single annular groove. In examples, the one or more grooves can include a single annular groove. In examples, the one or more grooves can include a plurality of grooves. In examples, the plurality of grooves can be circumferentially arranged. In examples, the plurality of grooves can be radially arranged. In examples, the one or more grooves can include a plurality of grooves that is circumferentially arranged or radially arranged.

In examples, the drive assembly can be an electromagnetic drive mechanism comprising a stator core and an armature coupled to the plunger. In examples, the plunger can include an elongate plunger body with a main portion and at least one shoulder portion. The spacer can be positioned between the armature and the at least one shoulder portion of the plunger. The main portion can form a minor diameter of the elongate plunger body. The at least one shoulder portion can form a major diameter of the elongate plunger body.

The present disclosure includes methods of reducing cavitation in a valve for a fuel pump. The method can include reciprocating a plunger within a valve body of the valve. The method can include directing, as the plunger reciprocates within the valve, a fluid to flow past the plunger and into one or more grooves in a spacer coupled to the plunger and configured to interface with the valve body. The method can include allowing small vapor-filled cavities caused rapid changes of pressure in the fluid from the plunger reciprocating within the valve body to collapse to collapse within the one or more grooves so as to inhibit cavitation of the spacer.

In examples of the method, the fluid can flow past the plunger and into the one or more grooves via fluid flow passage formed between the valve body and at least one flattened portion of the plunger. The at least one flattened portion can extend in a direction along a central axis of an elongate plunger body of the plunger.

DETAILED DESCRIPTION

Figure 1:
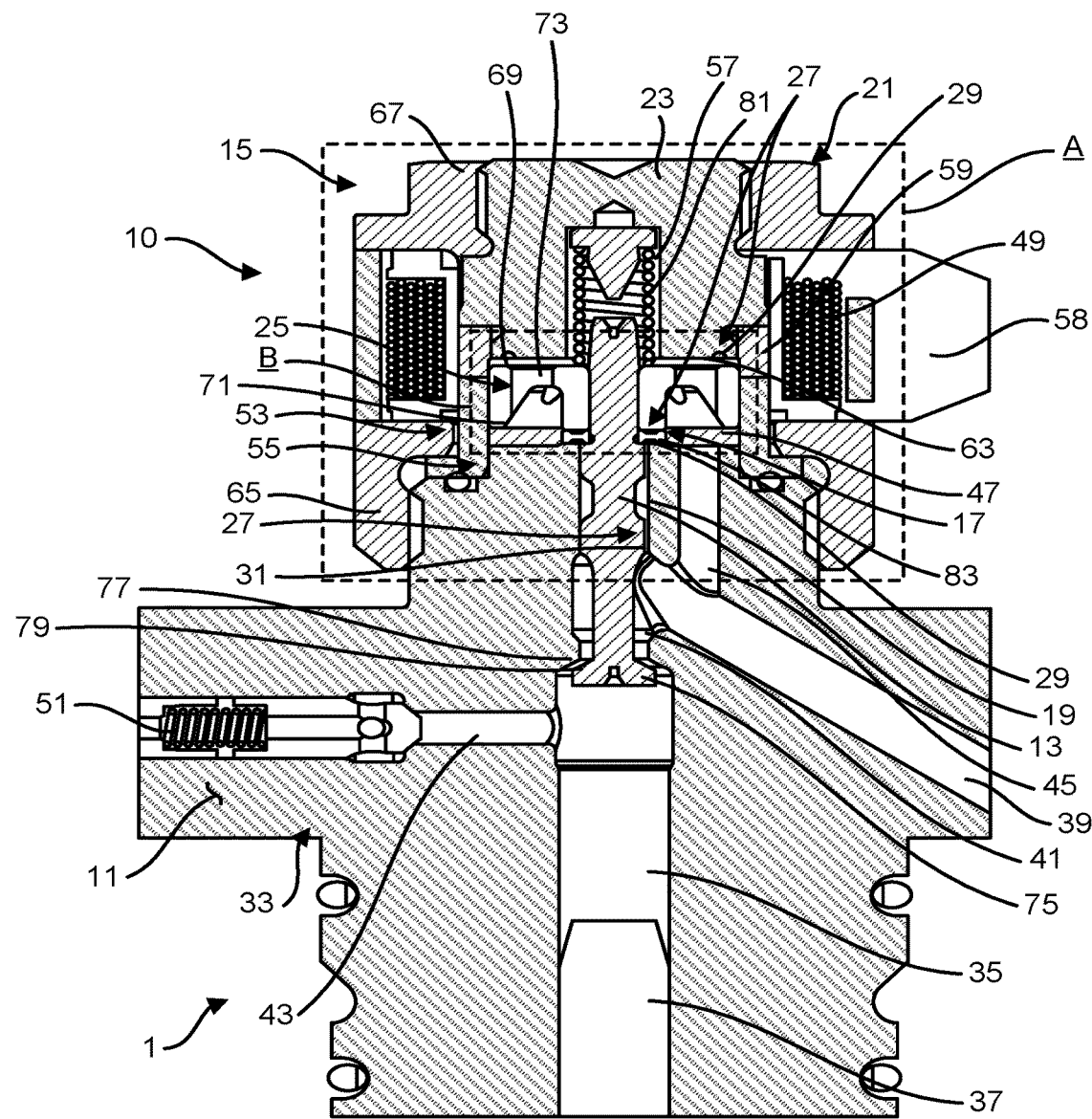
FIG. 1 is a cross sectional illustration of a fuel pump including an inlet valve, in accordance with examples.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings. It is not beyond the scope of this disclosure to have a number (e.g., all) the features in a given embodiment to be used across all embodiments.

FIG. 1 shows a diagrammatic illustration of a pump 1, such as a high-pressure fuel pump, including an inlet valve 10 that has a valve body 11, a valve plunger 13, a drive assembly 15, and a spacer 17. As explained in greater detail below, the valve body 11 can have a valve plunger barrel 19 formed therein, the valve plunger 13 can be arranged to perform reciprocal motion with respect to the valve plunger barrel 19, and the drive assembly 15 can be configured to cause the valve plunger 13 to perform reciprocal motion (e.g., within the valve plunger barrel 19). In examples, the drive assembly 15 can be an electromagnetic drive assembly 15 comprising a stator 21 with a stator core 23 and an armature 25 coupled to the valve plunger 13. In this regard, for instance, when the drive assembly 15 includes a stator 21 and an armature 25, the valve plunger 13 can be coupled to a portion of the drive assembly 15. Under these circumstances, the valve plunger 13 can be configured to perform, via the drive assembly 15, reciprocal motion within the valve body 11. Together, in examples, the valve plunger 13, the spacer 17, and optionally the armature 25 can form a valve plunger 13 assembly.

Figure 2:
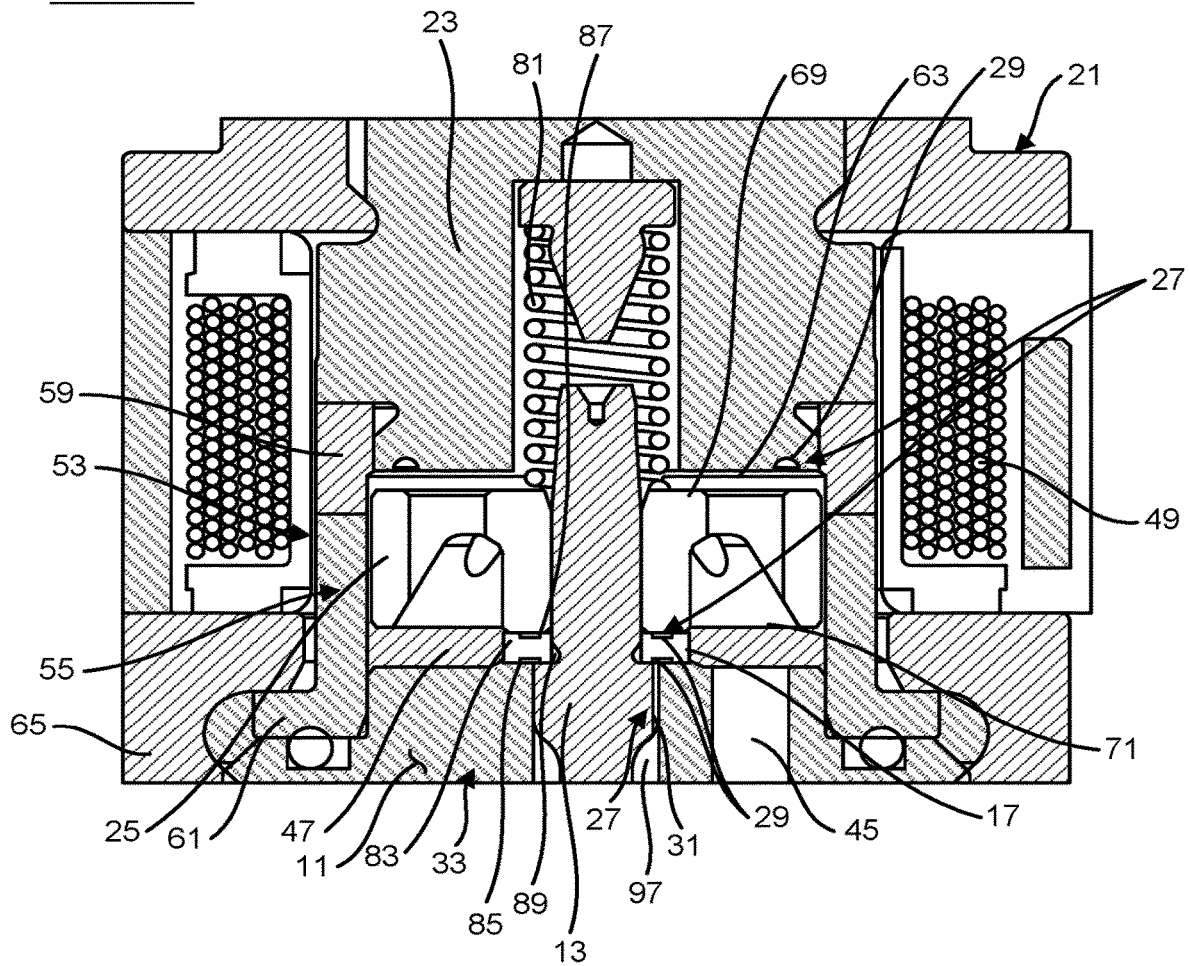
FIG. 2 is a detailed illustration of portions of the inlet valve shown in FIG. 1 taken at Detail A, in accordance with examples.

FIG. 2 shows a detailed illustration of portions of the inlet valve 10, including the valve plunger 13 and the spacer 17. As described in greater detail below, each of the valve plunger 13 and stator 21 can include one or more cavitation mitigation measures (e.g., a recess 27 or other structures such as a groove 29 or a flattened portion 31) thereon. Such cavitation mitigating structures (e.g., the groove 29 and the flattened portion 31) have been demonstrated to reduce an amount cavitation during operation of the pump 1 and/or wear on components such as the spacer 17 during any cavitation.

With reference to FIGS. 1 and 2, in addition to the inlet valve 10, the pump 1 includes a pump head 33 to which inlet valve 10 can be configured to be mounted. As shown, the pump head 33 includes a pumping chamber 35 and a pumping plunger 37 configured for reciprocal motion within the pumping chamber 35. An inlet passage 39 including a transition zone 41, and an outlet passage 43, are in fluid communication with the pumping chamber 35. A valve plunger barrel 19 configured to receive a valve plunger 13 extends into the transition zone 41 of the inlet passage 39. An actuator cavity vent passage 45 extends from the inlet passage 39 to a location fluidly coupled to an armature cavity 47 in the inlet valve 10. A check valve 51 is located in the outlet passage 43 in the illustrated examples.

Figure 3:
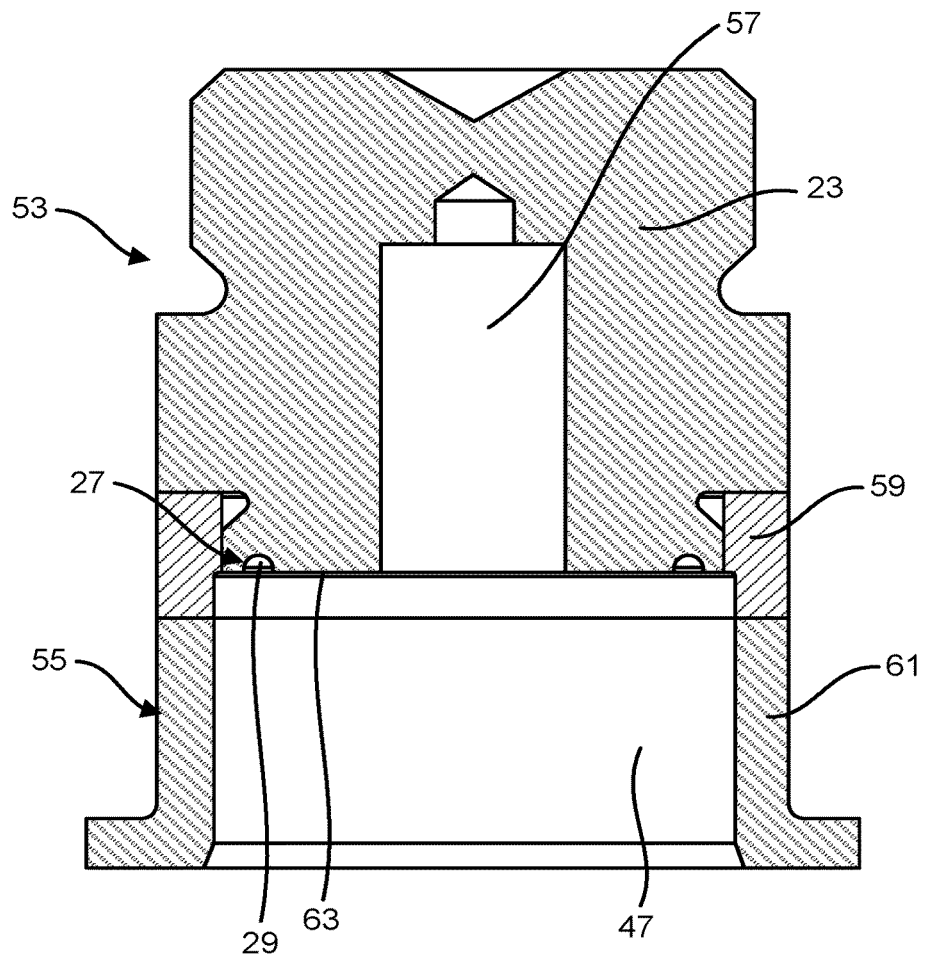
FIG. 3 is a cross sectional illustration of stator in FIG. 1, in accordance with examples.

As noted above, the inlet valve 10 includes the stator 21, armature 25 and valve plunger 13. The stator 21 includes a core assembly 53 and a solenoid coil 49. FIG. 3 shows an illustration of examples of the core assembly 53. The illustrated examples of core assembly 53 include a stator core 23 and a sleeve section 55. The stator core 23 is formed from magnetically permeable material such as iron and includes a spring pocket 57. The solenoid coil 49 extends around the exterior of the stator core 23 and includes a connector 58 (see FIG. 1) for coupling electrical energy to the windings of the coil. The sleeve section 55 of the core assembly 53 is a cylindrical member defining the armature cavity 47 and includes a reluctance ring such as a flux inhibiting section 59 (e.g., a flux inhibiting sleeve) adjacent to the stator core 23, and a flux carrier section 61 (e.g., a flux carrier sleeve) extending from the flux inhibiting section 59 opposite the stator core 23. In examples, the flux inhibiting section 59 is formed from relatively magnetically impermeable material, such as stainless steel, and the flux carrier section 61 is formed from relatively magnetically permeable material, such as iron. The stator core 23 defines a first surface 63 that faces the armature cavity 47. In examples, as shown here, the first surface 63 is a generally planar surface.

With reference to FIGS. 1-3, a retainer 65 engages a lip on the flux carrier section 61 of the core assembly 53 to secure the stator 21 to the pump head 33. The solenoid coil 49 is secured to the stator core 23 of the core assembly 53 by a fastener such as nut 67. In examples, the retainer 65 and nut 67 may be formed from relatively magnetically permeable materials. As shown in FIGS. 1 and 2, the armature cavity 47 of the stator 21 is in fluid communication with the valve plunger barrel 19 and the actuator cavity vent passage 45 when the stator 21 is mounted to the pump head 33. Fuel from the inlet passage 39 may therefore flow into the armature cavity 47 during operation of the pump 1.

The armature 25 is a disk-shaped member having a first surface 69 on a first side and a second surface 71 on a second, opposite side. The first surface 69 faces the first surface 63 of the stator core 23. In examples, the first surface 69 and second surface 71 of the armature 25 are generally planar surfaces. The armature 25 is configured for reciprocal motion in the armature cavity 47. During this reciprocal motion, the first surface 69 of the armature 25 is moved toward and away from the first surface 63 of the stator core 23. The illustrated examples of the armature 25 include through holes 73 through which fuel is allowed to flow into either side of the armature 25 to reduce pressure imbalances around the armature 25. Fuel that flows through the armature 25 may enter the spring pocket 57. The illustrated embodiment of inlet valve 10 also includes a spacer 17 (e.g., an annular flux inhibitor) around the valve plunger 13 on the side of the armature 25 adjacent the second surface 71. The spacer 17 may be formed from relatively magnetically impermeable materials, such as stainless steel for example, in examples. More details about the spacer 17 will be discussed below.

The valve plunger 13 is mounted to the armature 25 and extends through the valve plunger barrel 19. A valve plunger head 75 on an end of the valve plunger 13 is located in the pumping chamber 35. In the examples shown in FIG. 1-3, the pump head 33 defines a pump shoulder 77 at the intersection of the transition zone 41 of the inlet passage 39 and the pumping chamber 35. A sealing surface 79 on the side of the valve plunger head 75 can engage and disengage from the pump shoulder 77 of the pump head 33 during operation of the pump 1. More details about the valve plunger 13 will be discussed below.

More details about the components of the inlet valve 10 will be further discussed below. More specifically, after discussion of the drive mechanism immediately below, later discussion herein (e.g., with respect to FIGS. 4-6 and FIGS. 7-9) will provide more details about the cavitation mitigation measures featured in the spacer 17 and the valve plunger 13.

With continued reference to FIGS. 1-3, a biasing member, such as a spring 81, is located in the spring pocket 57. The spring 81 biases the armature 25 away from the stator core 23 of the stator 21 (e.g., in a downward direction in FIGS. 1 and 2) to a first position when the solenoid coil 49 is not actuated or energized. A gap will be present between the first surface 63 of the stator core 23 and the first surface 69 of the armature 25 when the armature 25 is in the first position. When the armature 25 is in the first position, the valve plunger 13 is driven by the armature 25 to an open position with the sealing surface 79 of the valve plunger head 75 spaced apart from the pump shoulder 77 of the pump head 33, thereby fluidly coupling the inlet passage 39 to the pumping chamber 35. When the solenoid coil 49 of the stator 21 is electrically actuated or energized, it generates a magnetic flux field that acts on the armature 25. The forces generated by the magnetic field are sufficient to overcome the bias force of the spring 81, and causes the armature 25 to retract (e.g., move in an upward direction in FIGS. 1 and 2) to a second position. When in the second position, the size of the gap between the armature 25 and stator core 23 is reduced from its size when the armature 25 was in the first position, and the first surface 63 of the stator core 23 is closer to the first surface 69 of the armature 25 than when the armature 25 was in the first position. In examples, the first surface 69 of the armature 25 is proximal to the first surface 63 of the stator core 23 when the armature 25 is in the second position to encourage the flow of the magnetic field across the gap. When the armature 25 is in the second position, the valve plunger 13 is driven by the armature 25 to a closed position with the sealing surface 79 of the valve plunger head 75 engaged with the pump shoulder 77 of the pump head 33 (e.g., the positions shown in FIGS. 1 and 2), thereby fluidly isolating the inlet passage 39 from the pumping chamber 35. In examples, components of the stator 21 such as armature 25, stator core 23, nut 67, retainer 65 and sleeve section 55 may be configured to concentrate portions of the magnetic flux field through the armature 25 and across the gap to the stator core 23.

A drive mechanism (not shown) reciprocally drives the pumping plunger 37 within the pumping chamber 35 during operation of the pump 1. Conventional or otherwise known drive mechanisms can be used for this purpose. In examples, for example, such drive mechanisms include a cam coupled to an engine to reciprocally drive the pumping plunger 37. An electrical control system (not shown) controls the operation of the inlet valve 10 as the pumping plunger 37 reciprocates within the pumping chamber 35 to cause the pumping plunger 37 to cyclically draw fuel into the pumping chamber 35, trap the fuel in the pumping chamber 35 and force the fuel out of the pumping chamber 35 through the outlet passage 43. In particular, as the pumping plunger 37 moves to make the pumping chamber 35 smaller with the pumping chamber 35 filled with fuel and the valve plunger 13 in the closed position by actuation of the inlet valve 10, the fuel pressure in the pumping chamber 35 rises until the check valve 51 opens and allows the fuel to flow out of the pumping chamber 35 through the outlet passage 43 into a downstream volume (e.g., a common rail fuel accumulator, not shown). This flow continues until the pumping plunger 37 reverses direction to make the pumping chamber 35 larger and the check valve 51 closes and the inlet valve 10 is de-actuated to allow the valve plunger 13 to move to the open position. Fuel is then able to flow into the pumping chamber 35 through the inlet passage 39. When the pumping chamber 35 is filled, the pumping plunger 37 reverses direction to make the pumping chamber 35 volume smaller, and the inlet valve 10 is actuated to drive the valve plunger 13 to the closed position, and the cycle repeats. The valve plunger 13 is thereby driven in synchronization with the pumping plunger 37 by the inlet valve 10, so as the pumping plunger 37 reciprocation rate increases or decreases, so too does the rate at which the inlet valve 10 opens and closes.

Figure 4:
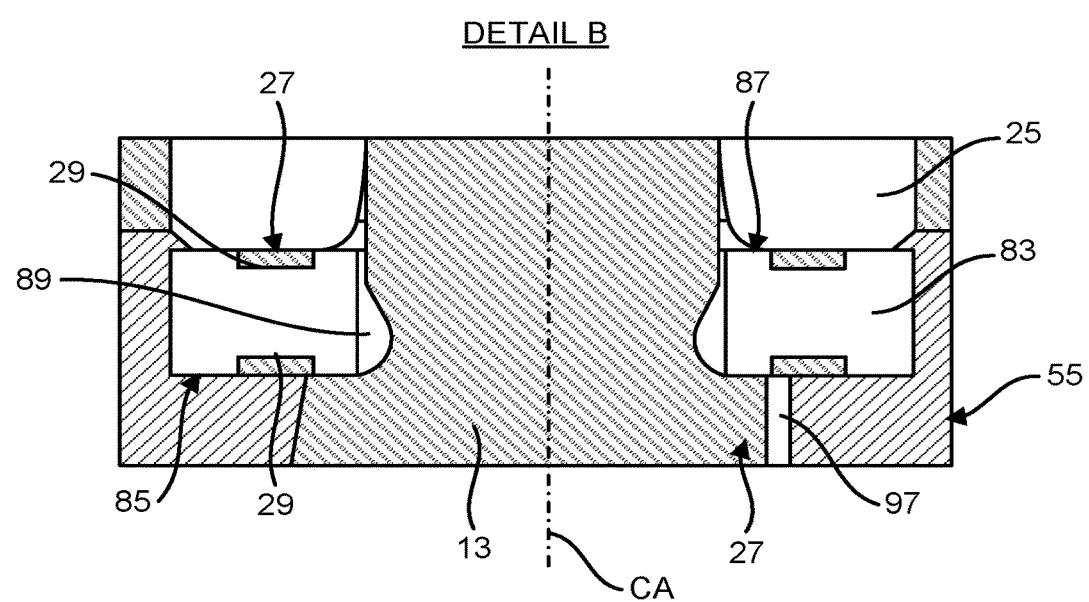
FIG. 4 is a detailed illustration of portions of the inlet valve shown in FIG. 1 taken at Detail B, in accordance with examples.
Figure 5:
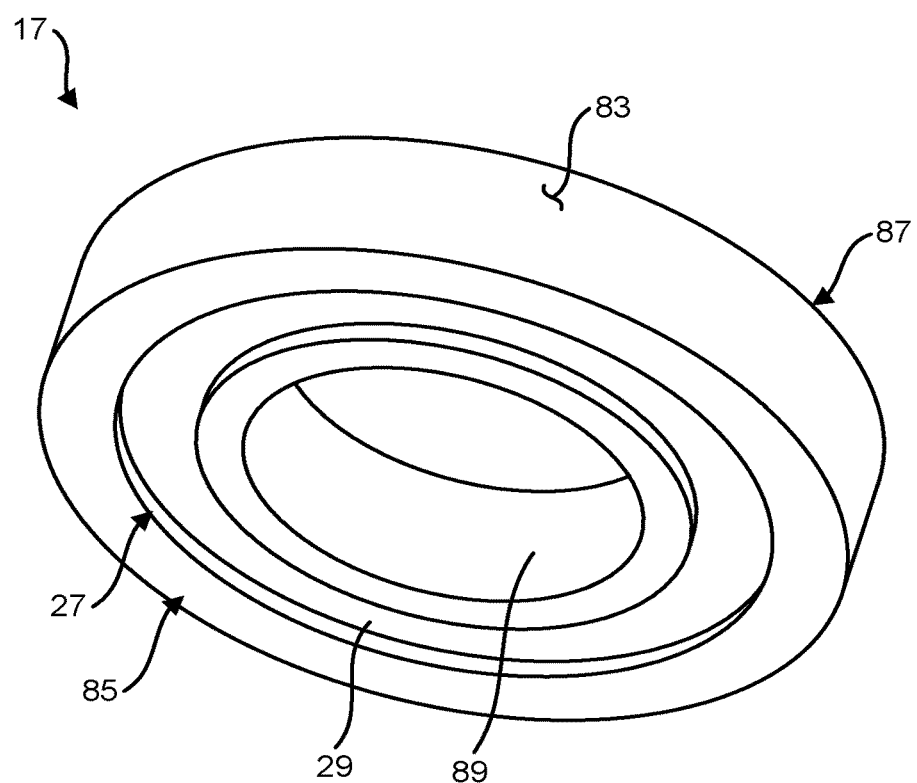
FIG. 5 is a detailed illustration of the spacer of the inlet valve shown in FIG. 1, in accordance with examples.

As noted above, with reference to FIGS. 1-3, one or more components of the inlet valve 10 can include cavitation mitigation structures that are configured to reduce or prevent cavitation that might otherwise occur at those components during operation of the pump 1. In examples, as further described below, the cavitation mitigation structures can comprise one or more grooves in a spacer body 83 of the spacer. The spacer body 83 can have a first spacer surface 85, a second spacer surface 87 that is opposite the first spacer surface 85, and a central aperture 89 that extends from the first spacer surface 85 to the second spacer surface 87. In addition, or in alternative, the cavitation mitigation structures can comprise one or more recesses 27 in any one or each of the first surface 69 of the armature 25 and the first surface 63 of the stator core 23. In this regard, due to the cavitation mitigation structures, wear on such components (e.g., the spacer 17, the armature 25, and the stator core 23) of the inlet valve 10 during operation of the pump 1 can be reduced by the cavitation mitigation structures. FIGS. 4 and 5, for example, illustrate a cavitation mitigation structure in the form of an annular groove 29 in the first spacer surface 85 and second spacer surface 87.

As also noted above, referring to FIGS. 1, 2, 4, and 5, the spacer 17 can be coupled between the armature 25 and a portion of the valve plunger 13 and can be formed from relatively magnetically impermeable materials (e.g., certain steels). So configured, the spacer 17 may assist in operation of the inlet valve 10 by ensuring that during operation thereof, the armature 25 does not magnetically couple to the pump head 33 such that the valve plunger 13 no longer reciprocates and, thus, causes the inlet valve 10 to remain opened. For instance, the spacer 17 can be configured to couple to the valve plunger 13 so as to perform reciprocal motion together with the valve plunger 13 and can be configured to interface with the pump head 33. The spacer 17 can be configured to receive the valve plunger 13 through the central aperture 89.

At least one of the first spacer surface 85 and the second spacer surface 87 can include one or more grooves 29 that are recessed into the spacer body 83 so as to reduce or inhibit cavitation of the spacer 17 where the spacer 17 interfaces with the pump head 33. The one or more grooves 29 can take a variety of forms. In examples, the one or more grooves 29 can include a single annular groove 29 at the first spacer surface 85 or the second spacer surface 87. In examples, both the first and second spacer surfaces 85, 87 can include the one or more grooves 29. In examples, the one or more grooves 29 at both the first and second spacer surfaces 85, 87 can include a single annular groove 29. In examples, the one or more grooves 29 can include a plurality of grooves 29. In examples, the plurality of grooves 29 can be circumferentially arranged, concentrically arranged, or both. In examples, the plurality of grooves 29 can be radially arranged. In examples, the one or more grooves 29 can include a plurality of grooves 29 that is circumferentially arranged or radially arranged.

Figure 6:
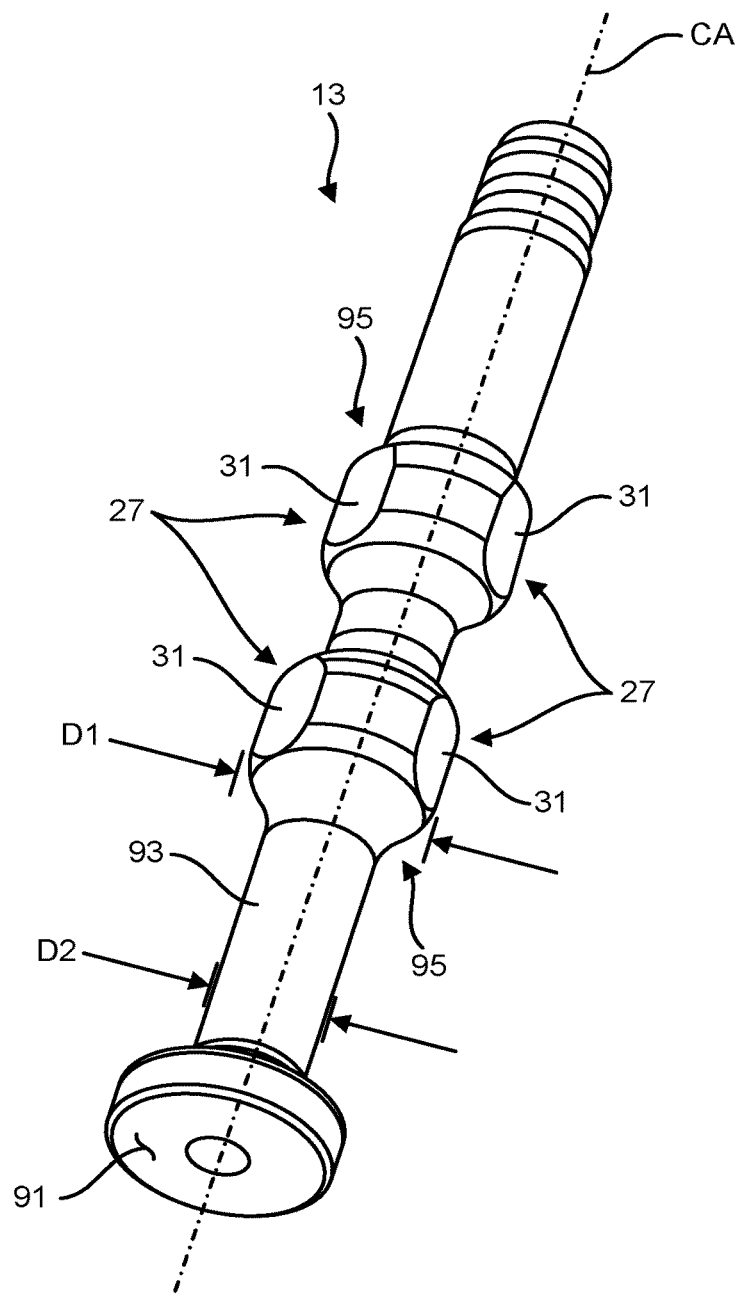
FIG. 6 is a detailed illustration of the valve plunger of the inlet valve shown in FIG. 1, in accordance with examples.

Valve plunger 13 is mounted to the armature 25 and extends through the valve plunger barrel 19. As best shown in FIG. 6, the valve plunger 13 can include an elongate valve plunger body 91 with a main portion 93 and at least one shoulder portion 95. The spacer 17 can be positioned between the portion of the drive assembly and the at least one shoulder portion 95 of the valve plunger 13. The main portion 93 can form a minor diameter D2 of the elongate valve plunger body 91, and the at least one shoulder portion 95 can form a major diameter D1 of the elongate valve plunger body 91. Each shoulder portion 95 in the at least one shoulder portion 95 can include at least one flattened portion 31, which can extend in a direction along a central axis CA of the elongate valve plunger body 91. Under these circumstances, fluid flow passage 97 can be formed between the valve plunger barrel 19 of the valve body 11 and at least one flattened portion 31 of the elongate valve plunger body 91. The fluid flow passage 97 can be in fluid communication with a groove 29 of the one or more grooves 29.

In examples, the spacer body 83 can be a closed ring shape such that the spacer 17 surrounds a portion of plunger that is coupled to the spacer 17.

Figure 7:
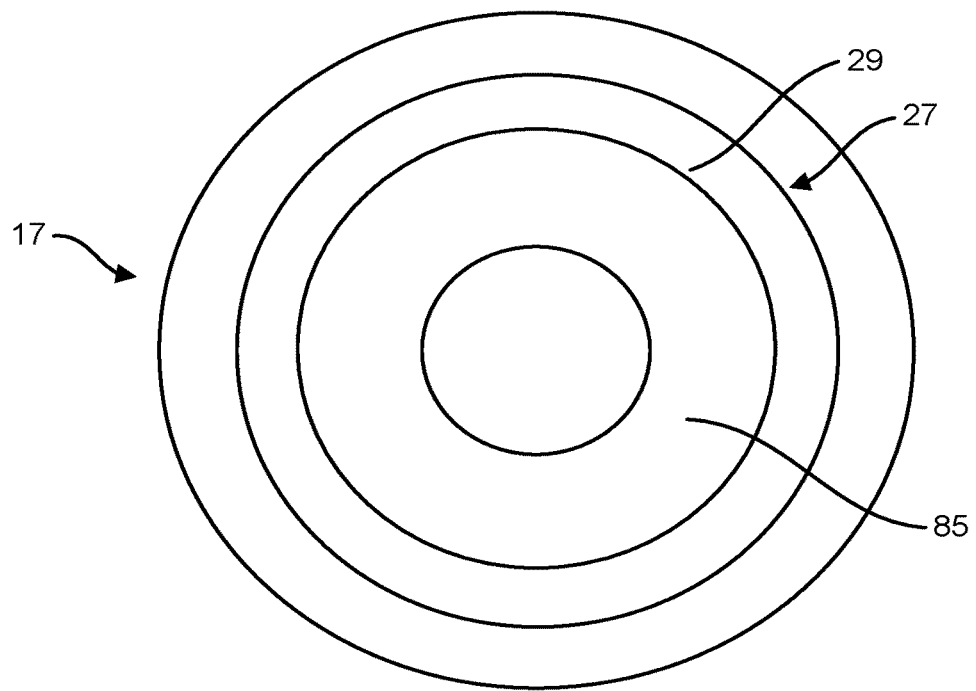
FIG. 7 is a plan view of a spacer showing a first spacer surface with a first arrangement of a plurality of grooves, in accordance with examples.
Figure 8:
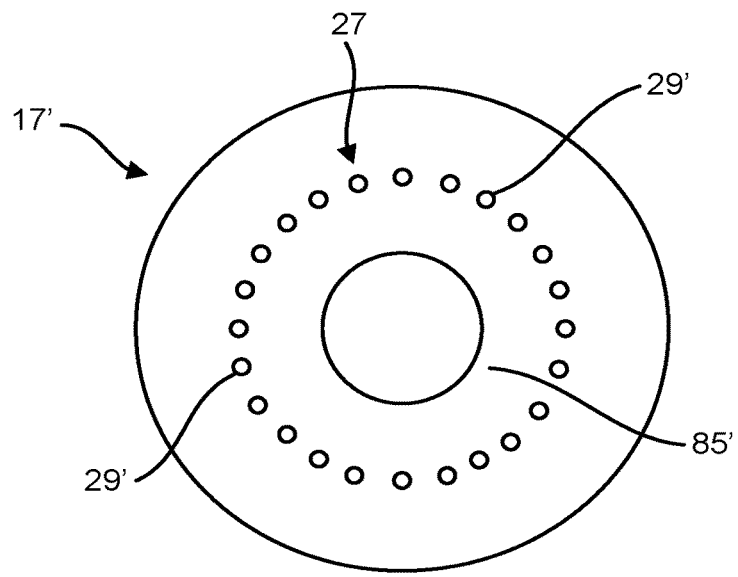
FIG. 8 is a plan view of a spacer showing a first spacer surface with a second arrangement of a plurality of grooves, in accordance with examples.
Figure 9:
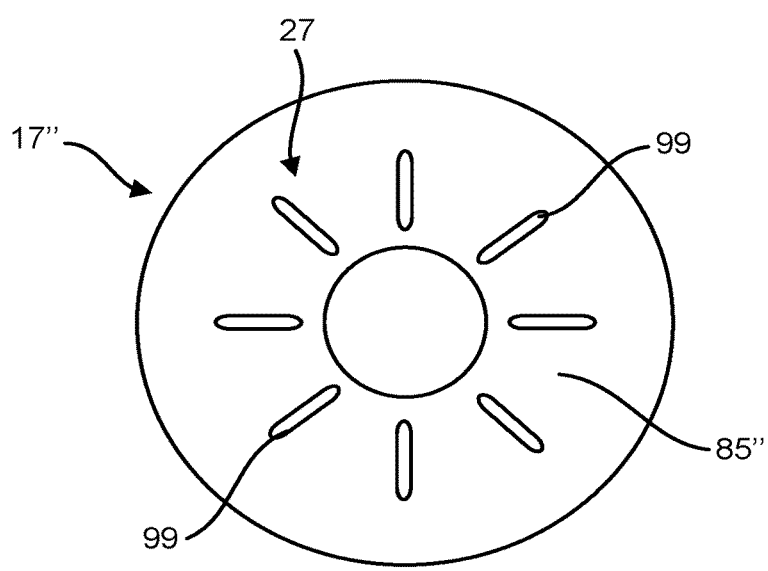
FIG. 9 is a plan view of a spacer showing a first spacer surface with a third arrangement of a plurality of grooves, in accordance with examples.

Although a single groove 29 for the spacer 17 is shown at both the first and second spacer surfaces 85, 87 in FIGS. 1, 2, 4, and 5 for purposes of example, other examples have recesses 27 in the form of an arrangement of grooves 29, 99 at the first spacer surface 85, 85', 85" only as shown in FIG. 7-9. What is more, these arrangements can have two or more (e.g., a plurality of) grooves 29', 99 as shown in FIGS. 8 and 9. FIG. 7 shows a plan view of the spacer 17 with a first arrangement of grooves 29 where the first spacer surface 85 has a single annular grooves 29. FIG. 8 shows a plan view of the spacer 17' with a second arrangement of grooves 29' where the first spacer surface 85' has a plurality of rounded grooves 29. FIG. 9 shows a plan view of the spacer 17" with a second arrangement of grooves 99 where the first spacer surface 85" has a plurality of linear grooves 99. Of course, these arrangements (e.g., the first, second, and third arrangements) are just some of many examples and can be included at the second spacer surface 87 only or both the first spacer surface 85, 85', 85" and the second spacer surfaces 87 in examples.

A variety of designs for recesses 27 in the spacer 17 can be achieved while still inhibiting or reducing cavitation. Groove 29 is continuous in the examples shown in FIG. 7. FIG. 8 illustrates examples of a spacer 17' including a first spacer surface 85' and a discontinuous annular groove 29' comprising a plurality of rounded grooves 29'. FIG. 9 illustrates examples of a spacer 17" including a first surface 85" and a cavitation mitigation structure comprising a plurality of radially extending linear grooves 99. The linear grooves 99 are circumferentially arranged on the first spacer surface 85". Dimensions of the recesses 27, such as the depth and/or length of the grooves 29, 29' and linear grooves 99, the number of structures such as the grooves 29, 29' and linear grooves 99, and the location of these structures on the first spacer surface 85, 85', 85", can be selected to optimize the cavitation mitigation functionality provided by the structures. In examples, the recesses 27 are configured to minimize or not substantially impact the magnetic flux field extending through the spacer 17, 17', 17" so as to prevent or not substantially impact performance capabilities of the inlet valve relating to the ability of the coil to drive the armature and thereby to drive the valve plunger. Although shown on the first spacer surface 85, 85', 85" of the spacer 17, 17', 17" for purposes of example in FIGS. 7-9, recesses 27 in other examples (e.g., shown in FIGS. 1, 2, 4, and 5) may additionally or alternatively include these recesses 27 on the second spacer surface 87. Testing has demonstrated that cavitation minimization structures of the types described above may significantly reduce wear on components such as the spacer 17, 17', 17" during actuation of the inlet valve.

Figure 10:
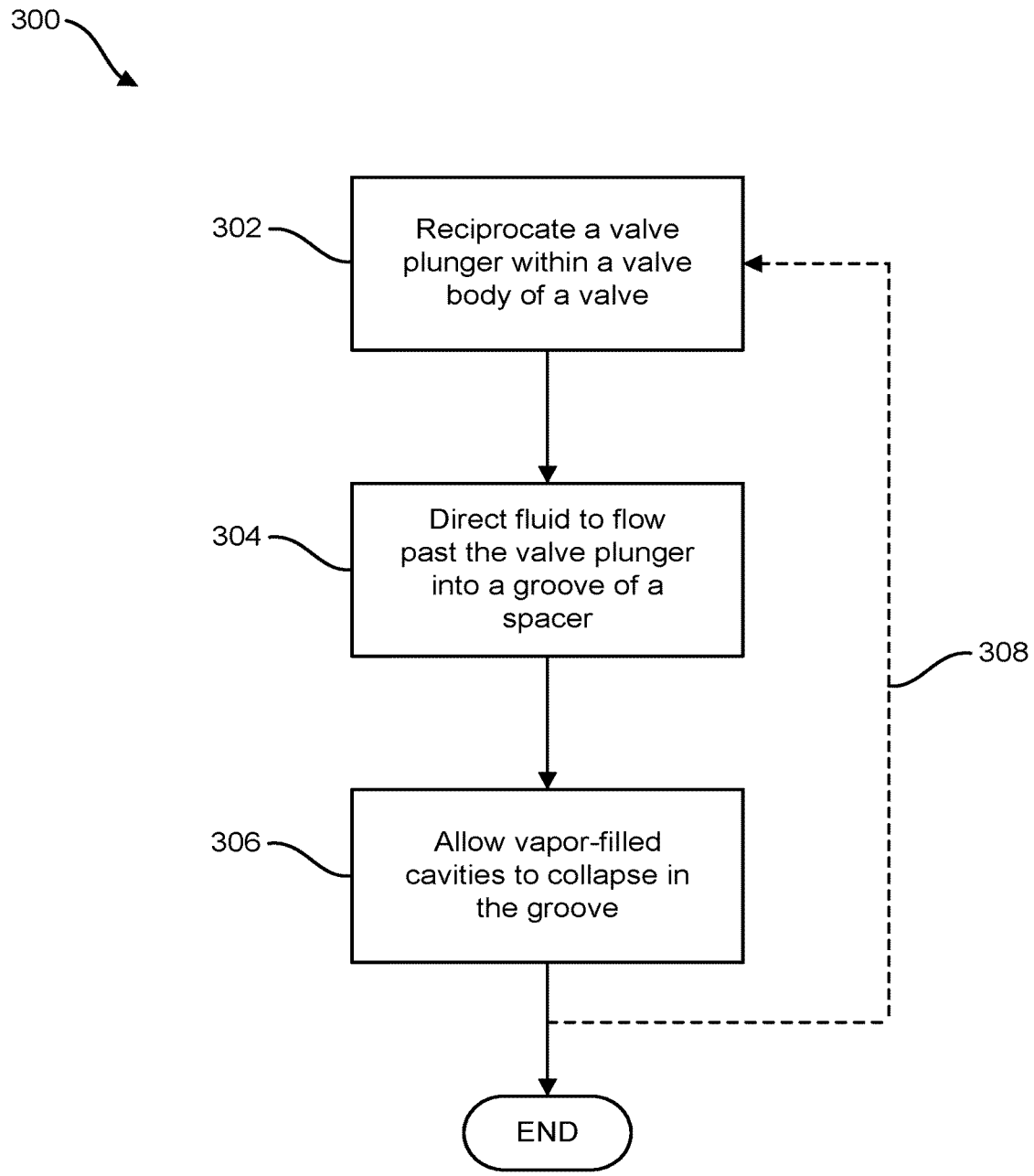
FIG. 10 is a flowchart of a method reducing cavitation in a valve, in accordance with examples.

The present disclosure includes methods of reducing cavitation in a valve for a fuel pump. For example, FIG. 10 shows a flowchart of such a method 300. At step 302, the method 300 can include reciprocating a valve plunger within a valve body of the valve. At step 304, the method 300 can include directing, as the valve plunger reciprocates within the valve, a fluid to flow past the valve plunger and into one or more grooves in a spacer coupled to the valve plunger and configured to interface with the valve body. At step 306, the method 300 can include allowing small vapor-filled cavities caused by rapid changes of pressure in the fluid from the valve plunger reciprocating within the valve body to collapse within the one or more grooves so as to inhibit cavitation. These steps can be repeated (e.g., for as long as the pump is operating) as indicated by a feedback loop 308. The method 300 may end, for example, when the pump ceases to operate.

In examples of the method 300, the fluid can flow past the valve plunger and into the one or more grooves via fluid flow passage formed between the valve body and at least one flattened portion of the valve plunger. The at least one flattened portion can extend in a direction along a central axis of an elongate valve plunger body of the valve plunger.

It is well understood that methods that include one or more steps, the order listed is not a limitation of the claim unless there are explicit or implicit statements to the contrary in the specification or claim itself. It is also well settled that the illustrated methods are just some examples of many examples disclosed, and certain steps may be added or omitted without departing from the scope of this disclosure. Such steps may include incorporating devices, systems, or methods or components thereof as well as what is well understood, routine, and conventional in the art.

The connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus While the present disclosure has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

We claim:

1. A valve for a fuel pump, comprising:
   a valve body that has a valve plunger barrel formed therein and that is configured to form part of a pump head of the fuel pump;
   a valve plunger arranged to perform reciprocal motion within the valve plunger barrel; and
   a spacer configured to couple to the valve plunger so as to perform reciprocal motion together with the valve plunger and configured to interface with the pump head, wherein the spacer has a spacer body with a first spacer surface, a second spacer surface that is opposite the first spacer surface, and a central aperture that extends from the first spacer surface to the second spacer surface and that is configured to receive the valve plunger therethrough, and wherein at least one of the first spacer surface and the second spacer surface includes at least one groove that is recessed into the spacer body so as to reduce or inhibit cavitation of the spacer where the pump head interfaces with the spacer, and wherein a fluid flow passage is formed between the valve plunger barrel and the valve plunger and is in fluid communication with the at least one groove.

2. The valve of claim 1, wherein the at least one groove comprises a single annular groove.

3. The valve of claim 1, wherein the at least one of the first spacer surface and the second spacer surface includes one or more grooves that are recessed into the spacer body, wherein the one or more grooves includes a plurality of grooves.

4. The valve of claim 3, wherein the plurality of grooves is circumferentially arranged.

5. The valve of claim 3, wherein the plurality of grooves is radially arranged.

6. The valve of claim 1, wherein the spacer body is a closed ring shape such that the spacer surrounds a portion of plunger that is coupled to the spacer.

7. The valve of claim 1, wherein both the first and second spacer surfaces include the at least one groove.

8. The valve of claim 7, wherein both the first and second spacer surfaces comprise a plurality of grooves.

9. The valve of claim 1, wherein the valve plunger is arranged within the valve plunger barrel and includes an elongate valve plunger body having a central axis that extends longitudinally through the elongate valve plunger body, wherein the elongate valve plunger body includes at least one flattened portion that extends in a direction along the central axis so as to form the fluid flow passage between the valve plunger barrel and the at least one flattened portion of the elongate valve plunger body of the valve plunger.

10. The valve of claim 9, wherein the elongate valve plunger body includes both a main portion with a first diameter and at least one shoulder portion with a second diameter that is larger than the first diameter, and wherein each shoulder portion in the at least one shoulder portion includes a respective flattened portion of the at least one flattened portion.

11. The valve of claim 1, further including a drive assembly configured to cause the valve plunger to perform reciprocal motion, the drive assembly being an electromagnetic drive assembly comprising a stator core and an armature coupled to the valve plunger.

12. The valve of claim 11, wherein the valve plunger includes an elongate valve plunger body with a main portion and at least one shoulder portion, wherein the spacer is positioned between the armature and the at least one shoulder portion of the valve plunger, and wherein the main portion forms a minor diameter of the elongate valve plunger body and the at least one shoulder portion forms a major diameter of the elongate valve plunger body.

13. The valve of claim 12, wherein a first shoulder portion of the at least one shoulder portion includes at least one flattened portion that extends in a direction along a central axis of the elongate valve plunger body so as to form a fluid flow passage between the valve plunger barrel, in which the valve plunger is arranged, and the at least one flattened portion, and wherein the fluid flow passage is in fluid communication with the at least one groove.

14. A valve plunger assembly comprising:
a valve plunger configured to perform, via a drive assembly, reciprocal motion within a valve body, wherein the valve plunger is coupled to a portion of the drive assembly, and wherein the valve body is configured with a valve plunger barrel to form part of a pump head of a fuel pump; and
a spacer coupled to the valve plunger so as to perform reciprocal motion together with the valve plunger and configured to interface with the pump head, wherein the spacer has a spacer body with a first spacer surface, a second spacer surface that is opposite the first spacer surface, and a central aperture that extends from the first spacer surface to the second spacer surface and that is configured to receive the valve plunger therethrough, and wherein at least one of the first spacer surface and the second spacer surface includes at least one groove that is recessed into the spacer body so as to reduce or inhibit cavitation of the spacer where the pump head interfaces with the spacer, and wherein a fluid flow passage is formed between the valve plunger barrel and the valve plunger and is in fluid communication with the at least one groove.

15. The valve plunger assembly of claim 14, wherein the at least one groove comprises a single annular groove.

16. The valve plunger assembly of claim 14, wherein the at least one of the first spacer surface and the second spacer surface includes one or more grooves that are recessed into the spacer body, wherein the one or more grooves includes a plurality of grooves that is circumferentially arranged or radially arranged.

17. The valve plunger assembly of claim 14, wherein the valve plunger includes an elongate valve plunger body with a main portion and at least one shoulder portion, wherein the spacer is positioned between the portion of the drive assembly and the at least one shoulder portion of the valve plunger, wherein the main portion forms a minor diameter of the elongate valve plunger body and the at least one shoulder portion forms a major diameter of the elongate valve plunger body, and wherein each shoulder portion in the at least one shoulder portion includes a respective flattened portion of at least one flattened portion that extends in a direction along a central axis of the elongate valve plunger body so as to form the fluid flow passage between the valve plunger barrel of the valve body and at least one flattened portion of the elongate valve plunger body of the valve plunger.

18. A method of reducing cavitation in a valve for a fuel pump, the method comprising:
reciprocating a valve plunger within a valve body of the valve;
directing, as the valve plunger reciprocates within the valve, a fluid to flow past the valve plunger and into at least one groove in a spacer coupled to the valve plunger and configured to interface with a pump head of the fuel pump, wherein the fluid flows via a fluid passage formed between the valve body and the valve plunger that is in fluid communication with the at least one groove; and
allowing vapor-filled cavities caused by rapid changes of pressure in the fluid from the valve plunger reciprocating within the valve body to collapse within the at least one groove so as to inhibit cavitation of the spacer.

19. The method of claim 18, wherein the at least one groove comprises a single annular groove.

20. The method of claim 18, wherein the fluid flows past the valve plunger and into the at least one groove via the fluid flow passage formed between the valve body and at least one flattened portion of the valve plunger, wherein the at least one flattened portion extends in a direction along a central axis of an elongate valve plunger body of the valve plunger.

* * * * *